United States Patent Office 3,285,744
Patented Nov. 15, 1966

3,285,744
PHOTOGRAPHY
Robert H. Sprague, Chagrin Falls, John A. Stewart, Parma, and James M. Lewis, Cleveland, Ohio, assignors to Horizons Incorporated, Cleveland, Ohio, a corporation of New Jersey
No Drawing. Filed Apr. 4, 1963, Ser. No. 270,551
11 Claims. (Cl. 96—90)

This invention relates to non-silver photosensitive compositions which print-out an image directly upon exposure to a suitable dosage of visible light, and to the use of such compositions as thin films in photographic processes. More particularly this invention relates to photosensitive compositions comprising at least one colorless leuco compound which when intimately admixed with one or more colorless activator compounds, yields a mixture which when exposed to visible light prints out a visible image directly at speeds which are of practical significance, and to the processing of such compositions to yield a permanent useful image.

(1) THE LEUCO COMPOUNDS

The leuco compounds which may be utilized in accordance with the present invention comprise two recognized classes of dye forming colorless compounds, namely leuco triarylmethane dyes and a second class of leuco compounds, related to leuco xanthenes, leuco thioxanthenes and leuco acridenes.

The leuco bases of triarylmethane dyes which are suitable in the compositions about to be described more fully are those represented by the general formula

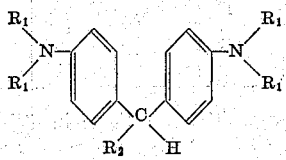

wherein each $R_1$ is selected from the group consisting of H, lower alkyl and aryl and the several R's may be the same or different, and $R_2$ is selected from the group consisting of H, aryl, alkyl and particularly

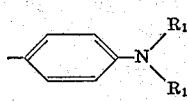

wherein each of the $R_1$'s is selected from the group consisting of H, alkyl and aryl.

Leuco dyes represented by the above formula which have been found suitable include:

leuco crystal violet
leuco opal blue
leuco malachite green
leuco rosaniline
leuco pararosaniline
p,p',p''-trimethyl leuco opal blue
p,p',p''-trichloro leuco opal blue
p,p'-bis-tetramethyl-diaminodiphenyl methane and other compounds of a similar nature.

The other class of leuco compounds which are suitable in the composition about to be described more fully, are generally similar to the leuco triarylmethane dyes except that they are characterized by the presence of one or more bridging hetero atoms and therefore are compounds which may be represented by the general formulas

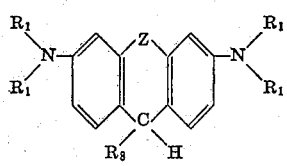

and

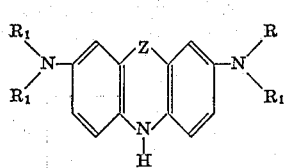

wherein each $R_1$ is selected from the group consisting of H, lower alkyl and aryl and may be the same or different and $R_8$ is selected from the group consisting of H, alkyl and aryl, including particularly

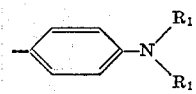

and wherein Z represents a member selected from the group consisting of O, S, Se and NH.

As indicated, the preferred leuco compounds of this class are substituted in the 3,6-positions and include 3,6-bis(dimethylamino)-9-(p-dimethylaminophenyl)xanthene
3,6-bis(diethylamino)-9-(p-dimethylaminophenyl)xanthene
3,6-bis(diethylamino)-9-(p-diethylaminophenyl)xanthene
3,6-bis(dimethylamino)-9-(p-dimethylaminophenyl)thioxanthene

(2) THE ACTIVATORS

A diverse group of colorless non-toxic sulfur-containing organic compounds have been found useful in the present invention. These fall into a number of classes as follows:

(1) Mercapto compounds of the general formula R—SH wherein the mercapto group is attached to a carbon atom in a heterocyclic nucleus of the type commonly used in cyanine dye chemistry, for example

| | |
|---|---|
| 2-quinoline | β-naphthothiazole |
| 4-quinoline | oxazole |
| 2-pyridine | benzoxazole |
| 4-pyridine | β-naphthoxazole |
| imidazole | selenazole |
| benzimidazole | benzoselenazole |
| thiazole | thiazoline |
| benzothiazole | | and the like.

(2) Disulfides of the general formula R—S—S—R wherein R has the same meaning as in 1 above.

(3) Disulfides of the general formula

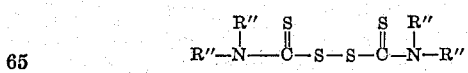

wherein R'' is selected from the group consisting of H, lower alkyl and aryl.

(4) Sulfides wherein the sulfide sulfur is attached to a carbon atom in a heterocyclic ring wherein the same carbon atom is attached to two non-carbon atoms e.g. as in rhodanine or tetrazole.

(5) Thioureas.
(6) Acyclic thioacetanilides.

(3) EVALUATION PROCEDURE

The data reported in the tables which follow is the result of tests establishing the effect of visible light on mixtures of various activator compounds with the indicated leuco bases. In general one of three procedures was followed.

In the first two, a mixture is prepared consisting of equal parts by volume of acetone and a 10% solution of polystyrene in benzene, 2 cc. of each being used in most instances. Then the indicated weights of the leuco compound and of the activator were dissolved in the mixture. The resulting composition formed from originally colorless materials had a cloudy or hazy appearance or a faint pinkish color in most instances. The composition was coated by means of a Bird applicator on 500-D Mylar in a coating having a 0.0015 inch wet thickness and the coating was permitted to dry in air. Thereafter the composition was exposed either to a photoflood lamp through a step tablet or on an Eastman Kodak Sensitometer with a suitable filter.

When the composition was exposed to a General Electric 500 watt RFL-2 Photoflood lamp exposure was through a #2 silver step wedge for a 5-minute interval at a distance of 12 inches from lamp to test materials. The density and number of steps visible in the image were red, after fixing the image by solvent wash or by heat.

When the composition was exposed on an Eastman Kodak No. 101 sensitometer the light was converted by the use of a 78AA filter, to equal mean noon-day light. The resulting image was fixed by a solvent wash or by exposure to heat. Thereafter the density of the image was red and the L.E.S. was computed as described above.

In a third procedure, the polystyrene was omitted from the compositions and instead a mixture of benzene and acetone was used as the solvent for the indicated amounts of the leuco compound and the activator. The solution was poured onto filter paper and the photosensitive material was then exposed through an Eastman No. 2 step tablet to one General Electric Reflector Photoflood lamp for 30 seconds at a distance of 12 inches from the lamp to the sensitive material. The densities of the resulting step wedge were read on an Eastman No. 1 color densitometer through the green filter.

L.E.S. (abbreviation for light exposure speed) refers to a speed rating system developed at the Wright Air Development Division of Air Research and Development Command (USAF), and is defined as the reciprocal of the exposure in meter candle seconds which is required to produce a double diffuse reflection density of 0.2 density units above base plus fog. As in the more conventional ASA system used to rate silver halide films, the higher the L.E.S. number the faster the film is.

Results of exposure tests with compositions consisting of equal weights of 3,6-bis(dimethylamino)-9-(p-dimethylaminophenyl)xanthene and various activators, dissolved in a mixture consisting of 2 cc. of acetone and 2 cc. of a 10% solution of polystyrene in benzene, coated, .0015 inch wet thickness on Mylar film, dried, exposed for 5 minutes to 1 General Electric No. 2 Reflector Photoflood lamp at a distance of 12 inches from lamp to photosensitive material through a silver step tablet and solvent fixed by at least two rinses in a mixture of 1 part acetone and 4 parts petroleum ether.

*Table I*

| No. | Activator | Weight in mg. | Number of steps | Density Gross | Density Base plus Fog | Density Net |
|---|---|---|---|---|---|---|
| 1 | 2-mercaptobenzoxazole | 50 | 21 | 2.55 | 0.09 | 2.46 |
|   |   | 100 | 21 | 2.85 | 0.05 | 2.80 |
| 2 | 2-mercaptobenzothiazole | 50 | 21 | 2.14 | 0.09 | 2.05 |
|   |   | 100 | 21 | 2.88 | 0.07 | 2.81 |
| 3 | 2-mercaptobenzimidazole | 100 | 10 | 0.25 | 0.10 | 0.15 |
| 4 | 2-mercapto-6-nitrobenzothiazole | 50 | 21 | 1.30 | 0.09 | 1.21 |
| 5 | 2-mercaptothiazoline | 100 | 10 | 1.75 | 0.05 | 1.70 |
| 6 | 2-mercapto-4-phenylthiazole | 100 | 21 | 1.84 | 0.30 | 1.54 |
| 7 | 2-mercapto-1-methylimidazole | 100 | 11 | 1.21 | 0.05 | 1.16 |
| 8 | 1-phenyl-5-mercaptotetrazole | 100 | 21 | 3.0+ | 0.35 | 2.65+ |
| 9 | 2-mercapto-4,6,6-trimethylthiazine | 100 | 13 | 1.82 | 0.05 | 1.77 |
| 10 | 2-mercapto-4-phenylthiazole | 100 | 21 | 1.84 | 0.30 | 1.54 |
| 11 | 2-mercaptoquinoline | 100 | 12 | 1.17 | 0.06 | 1.11 |
| 12 | 2-mercapto-β-naphthothiazole | 100 | 21 | 1.90 | 0.13 | 1.77 |
| 13 | 2-mercapto-pyridine | 100 | 8 | 0.62 | 0.04 | 0.58 |
| 14 | Bis(dimethylthiocarbamyl)disulfide | 100 | 11 | 0.76 | 0.09 | 0.67 |
| 15 | 2,2'-dithio-bis(benzothiazole) | 40 | 15 | 0.49 | 0.06 | 0.43 |
| 16 | Bis(3-phenyl-2-indolyl)disulfide | 100 | 13 | 0.62 | 0.06 | 0.56 |
| 17 | Bis(4-phenylthiazole)-2-disulfide | 100 | 13 | 1.60 | 0.10 | 1.50 |
| 18 | Rhodanine | 100 | 21 | 2.29 | 0.11 | 2.18 |
|   | Rhodanine (heat fixed) | 100 | 21 | 3.00 | 0.89 | 2.11 |
| 19 | 2,4-thiazolidinedione (heat fixed) | 75 | 15 | 2.80 | 0.17 | 2.63 |
| 20 | 4-mercaptopyridine (heat fixed) | 100 | 16 | 0.55 | 0.07 | 0.48 |
| 21 | Thioacetanilide (heat fixed) | 75 | 17 | 1.80 | 0.35 | 1.45 |
| 22 | α-Mercaptoacetanilide (heat fixed) | 50 | 14 | 1.59 | 0.15 | 1.44 |
| 23 | Thiocarbanilide (heat fixed) | 50 | 14 | 2.38 | 0.23 | 2.15 |

The same compositions as those in Table I were exposed using an Eastman No. 101 sensitometer with the light converted by the use of a 78AA Eastman filter to equal mean noon-day light and the exposed material was stabilized by two or more successive rinses in a mixture of 1 part acetone and 4 parts petroleum ether. The stabilized material was reexposed 4 minutes to the RFL-2 with no darkening. The densities in the resulting step wedges were read with an Eastman No. 1 color densitometer using the green filter, the results were as reported in Table II.

*Table II*

| No. | Exp. Min. | Number of steps | Density Gross | Density Base plus Fog | L.E.S. |
|---|---|---|---|---|---|
| 1 | 60 | 13 | 1.30 | 0.10 | 1.2×10⁻⁵ |
| 2 | 60 | 16 | 2.03 | 0.16 | 3.3×10⁻⁵ |
|   | 60 | 18 | 1.84 | 0.14 | 6.6×10⁻⁵ |
|   | 2 | 18 | 1.53 | 0.20 | 1.2×10⁻³ |
| 3 | | | | | |
| 4 | 60 | 6 | 0.25 | 0.09 | Too slow |
| 5 | 60 | 11 | 0.43 | 0.10 | 2.4×10⁻⁶ |
| 6 | 2 | 10 | 0.58 | 0.15 | 1×10⁻⁴ |
| 7 | 60 | 5 | 0.55 | 0.08 | 1.8×10⁻⁶ |
| 8 | 2 | 12 | 0.86 | 0.26 | 1.4×10⁻⁴ |
| 9 | 60 | 11 | 0.72 | 0.08 | 4.3×10⁻⁶ |
| 10 | 2 | 9 | 0.58 | 0.15 | 1.0×10⁻⁴ |
| 11 | 60 | 11 | 0.44 | 0.09 | 2.3×10⁻⁵ |
| 12 | 60 | 8 | 0.42 | 0.14 | 1.1×10⁻⁶ |
| 13 | 60 | 4 | 0.32 | 0.08 | 1.7×10⁻⁶ |
| 14 | 60 | 6 | 0.53 | 0.10 | 1.9×10⁻⁵ |
| 15 | | | | | |
| 16 | | | | | |
| 17 | 60 | 6 | 0.47 | 0.09 | 2.5×10⁵ |
| 18 | 2 | 9 | 0.38 | 0.13 | 4.2×10⁻⁵ |
|   | 60 | 21 | 2.00 | 0.28 | 9×10⁻⁶ |

Table II—Continued

| No. | Exp. Min. | Number of steps | Density Gross | Density Base plus Fog | L.E.S. |
|---|---|---|---|---|---|
| 19 | 60 | 13 | 1.00 | 0.17 | $5.6 \times 10^{-6}$ |
| 20 | 60 | 13 | 0.40 | 0.10 | $6.2 \times 10^{-6}$ |
| 21 | 120 | 11 | 1.25 | 0.40 | $7.7 \times 10^{-6}$ |
| 22 | 60 | 6 | 0.70 | 0.12 | $2.9 \times 10^{-6}$ |
| 23 | 30 | 4 | 0.46 | 0.23 | $2.7 \times 10^{-6}$ |

Utilizing the filter paper procedure described above, with a solvent mixture consisting of 4 cc. of acetone and 4 cc. of benzene and containing 100 mg. of 3,6-bis(dimethylamino) - 9 - (p - dimethylaminophenyl)xanthene as the leuco dye base and 100 mg. of the activator or sensitizer or in instances where the 100 mg. of activator would not dissolve, a saturated solution of the activator was used.

Table III

| No. | Activator | Weight in mg. | Solvent, cc. | No. Steps | Densities Max. Den. | Densities Base +Fog | Densities Net. Den. |
|---|---|---|---|---|---|---|---|
| 1 | None | 0 | 8 | 3 | 1.05 | 0.75 | 0.30 |
| 2 | 2,2'-dithio-bis(benzothiazole) | 100 | 8 | 8 | 2.51 | 1.25 | 1.26 |
| 3 | 2,3-quinoxalinedithion | *S | 8 | 11 | 2.08 | 0.80 | 1.28 |
| 4 | Bis(2-quinolyl)disulfide | 100 | 8 | 15 | 1.80 | 0.73 | 1.07 |
| 5 | Bis(3-phenyl-2-indolyl)disulfide | 100 | 8 | 16 | 1.90 | 0.70 | 1.20 |
| 6 | 2-mercapto-β-naptho-thiazole | 100 | 8 | 21 | 3+ | 0.80 | 2.2 |
| 7 | Bis(β-naphthothiazole)-2-disulfide | 100 | 8 | 14 | 1.65 | 0.65 | 1.00 |
| 8 | 2-mercaptobenzothiazole | 100 | 8 | 10 | 3+ | 2.05 | 0.95 |
| 9 | 2-quinoline isothiouronium chloride | *S | 8 | 5 | 1.52 | 1.00 | 0.52 |

*Saturated solution.

The effect of 2-mercaptobenzothiazole on the light sensitivity of various leuco compounds is shown in Table IV which follows. The results reported were obtained using the following procedure.

A mixture was formed consisting of 2 cc. of acetone and 2 cc. of a 10% solution of polystyrene in benzene. Then 100 mg. of the leuco dye base and 100 mg. of the 2-mercaptobenzothiazole were dissolved in the mixture. The resulting solution was coated at a wet thickness of 0.0015-inch with a Bird applicator bar on unsubbed 300-D Mylar. The coatings were air-dried for approximately 15 minutes before exposure.

The coatings were exposed under an Eastman No. 2 Step Tablet for 5 minutes to one General Electric No. 2 Reflector Photoflood lamp at a distance of 12 inches from the lamp to the photosensitive material.

Exposures were also made, using an Eastman No. 101 sensitometer with the light converted by the use of a 78AA Eastman filter to equal mean noonday light.

The exposed material was stabilized by two or more successive rinses in a mixture of 1 part acetone and 4 parts petroleum ether. The stabilized material was reexposed 5 minutes to the RFL 2, with no darkening. The densities in the resulting step wedges were read with an Eastman No. 1 color densitometer, using the green filter.

Table IV

| Leuco Compound | Weight in mg. | Exp. Min. | Number of Steps | Exposed to No. 101 Densities Gross | Exposed to No. 101 Densities Base+Fog | Exposed to No. 101 Densities L.E.S. | Exposed to RFL-2 Densities Gross | Exposed to RFL-2 Densities Base+Fog |
|---|---|---|---|---|---|---|---|---|
| (1) | 100 | 60 | 14 | 1.96 | 0.13 | $1.8 \times 10^{-5}$ | | |
|  | 100 | 5 | 21 | | | | 2.81 | 0.09 |
| (2) | 100 | 60 | 15 | 0.39 | 0.07 | $2.8 \times 10^{-6}$ | | |
|  | 100 | 5 | 21 | | | | 0.72 | 0.07 |
| (3) | 100 | 90 | 5 | 0.37 | 0.05 | $9.4 \times 10^{-7}$ | | |
|  | 100 | 5 | 11 | | | | 1.47 | 0.06 |
| (4) | 100 | 60 | 6 | 0.65 | 0.09 | $1.5 \times 10^{-5}$ | | |
|  | 100 | 5 | 16 | | | | 2.20 | 0.05 |
| (5) | 50 | 60 | 18 | 1.84 | 0.14 | $6.6 \times 10^{-5}$ | | |
|  | 50 | 5 | 21 | | | | 2.14 | 0.09 |
|  | 100 | 2 | 18 | 1.53 | 0.20 | $1.2 \times 10^{-3}$ | | |
|  | 100 | 5 | 21 | | | | 2.88 | 0.07 |

Leuco Compounds:
(1) 3,6-bis(diethylamino)-9-(p-dimethylaminophenyl)xanthene.
(2) Leuco Opal Blue (tri-(p-anilino)-triphenylmethane).
(3) Tri-(p-diethylaminophenyl)methane.
(4) Leuco Crystal Violet.
(5) 3,6-bis dimethylamino-9-(p-dimethylaminophenyl)xanthene.

FIXING

Two distinct methods of fixing or stabilizing the colored image produced have been described. In the one the exposed material is subjected to two or more 15 second rinses with a suitable solvent and in the other the exposed material is subjected to mild heat (125° C.) for about 4 minutes. The method of stabilization selected in any specific instance will depend to some extent upon the materials being used and it is to be noted that many of the "slower" compositions may be preferable to some of the "faster" compositions because some of the latter are less susceptible to heat or dry fixing than some of the former.

While not wishing to be bound by any specific theory as to the manner in which the exposure to visible light to an intimate mixture comprising two or more originally colorless compounds produces a colored image, it is believed that the final colored image which forms in the light struck areas is always the dye which forms as a result of oxidation of the leuco base. Furthermore it appears that when the photosensitive mixture is prepared, on mixing the compounds which are colorless, a weakly tinted mixture is formed.

It is also considered possible that the real active ingredient in the mixture is that very minute amount of an oxidized product which results when the leuco base is exposed to oxygen e.g. in the ordinary atmosphere.

Whatever the true mechanism each of the activators listed above, or mixtures of the same, bring about oxidation of the leuco compound upon exposure to a suitable dose of visible light and as a result form a direct visible print-out image in the light struck areas.

PROPORTIONS

The relative proportions of the leuco dye bases and the activators for the same may be varied considerably from the 1:1 weight proportions given by way of illustration in the examples and are preferably within the range between 10 to 1 and 1 to 10 parts by weight.

As with other photosensitive compositions if not used at the time they are prepared the compositions of the present invention should be stored in cool dark relatively dry surroundings.

Having now described the invention in accordance with the patent statues it is not intended that it be limited except as may be required by the appended claims.

We claim:
1. A composition which prints out a visible image directly as a result of exposure to visible light said composition consisting essentially of an intimate mixture of
(1) at least one leuco compound selected from the group consisting of leuco compounds represented by one of the following general formulas

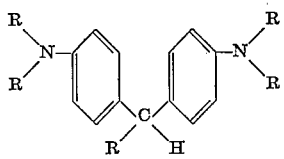

wherein each R is selected from the group consisting of H, lower alkyl and aryl and not all of the R's need be the same;

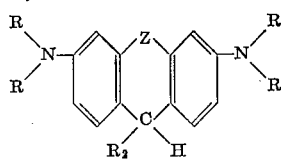

wherein each R has the same meaning as indicated above and $R_2$ is selected from the group consisting of H, lower alkyl and aryl;

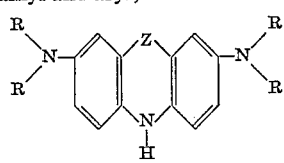

and wherein each R has the same meaning as indicated above and Z represents a member selected from the group consisting of O, S, Se and —NH; and
(2) at least one colorless non-toxic sulfur containing organic compound selected from the group consisting of (a) mercapto compounds represented by the formula R'—SH wherein R' is a heterocyclic nucleus of the type commonly used in cyanine dye chemistry;
(b) disulfides represented by the general formula R'—S—S—R' wherein each R' has the same meaning as in (a);
(c) disulfides of the general formula

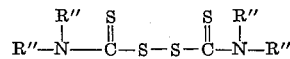

wherein R" represents H, alkyl and aryl;
(d) thiourea compounds;
(e) acyclic thioacetanilides;
said compounds being present in said mixture in proportions ranging between 10:1 and 1:10 relative to each other, by weight.

2. The composition of claim 1 wherein the leuco compound is a leuco base of a triphenylmethane dye.

3. The composition of claim 1 wherein the sulfur containing compound is a 2-mercapto heterocyclic compound.

4. The composition of claim 3 wherein the sulfur containing compound is 2-mercaptobenzothiazole.

5. The composition of claim 1 wherein the mixture consists of 3,6-bis(dimethylamino)-9-(p-dimethylaminophenyl)xanthene and a heterocyclic mercaptan.

6. A dry film consisting of the compositions of claim 1 dispersed in a thin layer on an inert support.

7. The film of claim 2 wherein the support is a film forming plastic.

8. The film of claim 2 wherein the binder is a cellulose compound selected from the group consisting of cellulose and cellulose derivatives.

9. The film of claim 2 wherein the support is transparent.

10. The process of producing a direct print-out image from originally colorless compounds which comprises preparing the composition of claim 1 in the form of a thin layer, exposing said layer to visible light and fixing the image which prints out directly as a result of said exposure.

11. The composition of claim 1 wherein the leuco compound is a leucoxanthene.

References Cited by the Examiner

UNITED STATES PATENTS

| | | | |
|---|---|---|---|
| 1,850,162 | 3/1932 | Wendt et al. | 96—48 |
| 1,871,830 | 8/1932 | Wendt et al. | 96—48 |
| 1,918,623 | 7/1933 | Wendt | 96—90 |
| 2,082,178 | 6/1937 | Ochwat et al. | 96—90 |
| 2,281,895 | 5/1942 | Poser et al. | 96—89 X |
| 3,042,515 | 7/1962 | Wainer | 96—90 X |
| 3,042,516 | 7/1962 | Wainer | 96—90 |
| 3,055,758 | 9/1962 | McDonald | 96—48 |
| 3,100,703 | 8/1963 | Sprague et al. | 96—90 |
| 3,104,973 | 9/1963 | Sprague et al. | 96—89 |
| 3,113,024 | 12/1963 | Sprague et al. | 96—90 X |

OTHER REFERENCES

Menzies, D. W.: Photo-Sensitivity of Thiazine Leucobases, Nature, 191, 505–6 (July 29, 1961).

Sprague et al.: "Investigation of Photopolymerization Processes," ASD Tech. Report 61–82, May 15, 1961 (AD–258412–L), pages 1–18 are of interest.

NORMAN G. TORCHIN, Primary Examiner.

A. L. LIBERMAN, D. PRICE, Assistant Examiners